United States Patent [19]

Colarusso et al.

[11] Patent Number: 4,585,682
[45] Date of Patent: Apr. 29, 1986

[54] ROOFING MEMBRANES

[75] Inventors: Peter C. Colarusso, Saugus; Bahram Siadat, Boxboro, both of Mass.

[73] Assignee: W. R. Grace & Co., Cambridge, Mass.

[21] Appl. No.: 497,451

[22] Filed: May 23, 1983

[51] Int. Cl.⁴ .................. B32B 3/00; B32B 7/02; B32B 7/04; B32B 7/12

[52] U.S. Cl. ........................ 428/57; 428/40; 428/215; 428/246; 428/286; 428/354; 428/463; 428/468; 428/489; 428/910; 428/913

[58] Field of Search .............. 428/468, 461, 349, 164, 428/910, 913, 213, 214, 215, 246, 286, 40, 57, 354, 355, 463, 489

[56] References Cited

U.S. PATENT DOCUMENTS

| | | | |
|---|---|---|---|
| 2,710,821 | 6/1955 | Fischer | 154/130 |
| 3,290,206 | 12/1966 | Johnson et al. | 161/164 |
| 3,369,959 | 2/1968 | Noyes | 161/189 |
| 3,445,055 | 5/1969 | Port et al. | 229/53 |
| 3,454,461 | 7/1969 | Paxton | 161/189 |
| 3,836,425 | 9/1974 | Whiting, Jr. | 161/165 |
| 3,900,102 | 8/1975 | Hurst | 206/411 |
| 3,914,521 | 10/1975 | Beatty et al. | 428/461 |
| 4,085,244 | 4/1978 | Stillman | 428/192 |
| 4,091,135 | 5/1978 | Tajima et al. | 428/468 |
| 4,092,452 | 5/1978 | Hori et al. | 428/215 |
| 4,096,309 | 6/1978 | Stillman | 428/285 |
| 4,133,924 | 1/1979 | Seino et al. | 428/164 |
| 4,188,443 | 2/1980 | Mueller et al. | 428/216 |
| 4,194,039 | 3/1980 | Mueller et al. | 428/213 |
| 4,396,665 | 8/1983 | Rowe | 428/148 |

FOREIGN PATENT DOCUMENTS

| | | | |
|---|---|---|---|
| 823193 | 9/1969 | Canada . | |
| 45893 | 2/1982 | European Pat. Off. | 428/468 |
| 7603969 | 9/1977 | France . | |
| 15996 | 11/1968 | Japan . | |
| 1332441 | 10/1973 | United Kingdom . | |
| 2019314 | 10/1979 | United Kingdom . | |
| 1568795 | 6/1980 | United Kingdom . | |
| 2037658 | 7/1980 | United Kingdom . | |

Primary Examiner—William J. Van Balen
Attorney, Agent, or Firm—John J. Wasatonic; William L. Baker

[57] ABSTRACT

Waterproofing membranes are disclosed comprising a shrinkable polymer film bonded to a foil layer by a layer of thermoplastic adhesive having sufficient bonding strength below the shrinkage onset temperature of the polymer film to inhibit relative movement between the film and the foil and having sufficient plasticity above the shrinkage onset temperature of the polymer film to permit relative movement between the film and the foil. In a preferred embodiment, the membrane is made self adhesive by including a layer of an adhesive material on that surface of the foil opposite the layer of the thermoplastic adhesive.

31 Claims, 3 Drawing Figures

ROOFING MEMBRANES

BACKGROUND OF THE INVENTION

This invention relates to membranes adapted for the waterproofing and sealing of substrate structures, particularly in roofing applications. More particularly, this invention relates to waterproofing membrane laminates adapted to have improved dimensional stability and to exhibit minimal adverse physical change in their laminar structure under the conditions of high temperature normally encountered in a roof top environment.

Flexible sheet-like laminates of support films and self-adhesive bituminous waterproofing layers preformed in the factory have been successfully employed in roofing applications as substitutes for the more conventional waterproofing membranes which are constructed at the job site by plying together one or more layers of bitumen-saturated paper or felt and bituminous adhesives. The pre-formed, self-adhesive laminate-membranes offer many advantages including factory controlled preparation, avoidance of heating equipment and handling of hot materials at the job site, as well as many performance advantages.

Flexible pre-formed laminates of the aforementioned type and their use to form waterproofing layers in various kinds of building structures are described for example in U.S. Pat. Nos. 3,741,856; 3,853,682; and 3,900,102 to John Hurst. Such patents describe in particular the preparation of flexible laminates containing a support material, for example a layer of a polymeric or metallic film, and a layer of self-adhesive or pressure-sensitive adhesive, bitumen-elastomer waterproofing composition. As discussed in particular in U.S. Pat. No. 3,900,102, such laminates may ideally be constructed in the plant in the form of a roll with a protective sheet, for example siliconized paper applied against the self-adhesive bituminous waterproofing layer, transported to the job site, and thereafter applied to a substrate adhesive side down, each successive laminate strip being made to overlap the edge of the previously applied strip of laminate to insure a continuous waterproofing seal.

U.S. Pat. No. 4,396,665 of Paul E. Rowe relates to an improved laminate which employs a thin layer of metal film or foil positioned between and adhered to a polymeric film and a layer of a waterproofing pressure-sensitive adhesive or self-adhesive bituminous composition. These laminates may be viewed as comprising a "composite" support system, consisting of the polymer film-metal film laminate which carries or supports the adhesive layer. Oriented polymer films, such as those of Canadian Pat. No. 1,008,738, are the preferred polymer films for use in these laminates. Such oriented films, which can be biaxially oriented or oriented and cross-laminated films, exhibit reduced wrinkling following adhesion to a substrate and subsequent exposure to heat, for example, exposure to the sun. The thin metal layer provides increased fire protection; prevents oils in the bituminous composition from contacting the polymer film, with a resultant increase in the physical and chemical stability of the film; and, since it is rigidly bonded to the film and has a substantially lower coefficient of thermal expansion, provides a realtively high level of dimensional stability to the laminate under high temperature conditions. In addition, the relative coefficient of thermal expansion of the film and foil are such that, at elevated temperatures, the edges of the laminate tend to curl downward so as to provide a "self-sealing" effect in overlapping (joint) areas of adjacent, overlapping laminates.

Although the laminates of the aforementioned application, and more specifically the composite support system thereof, provide certain advantages, they can be further improved or optimized for roofing applications. For example, when the laminates are subjected to the relatively high surface temperatures of the black roof environment, e.g., above 160° F., the oriented polymer film has been found to undergo cracking leading to membrane degradation. This adversely affects the appearance of the membrane, largely eliminates the protection originally afforded the underlying foil and bituminous adhesive by the polymer film, and increases the possibility of leakage, particularly at overlap joints between adjacent membranes. In addition, when subjected to the relatively high temperature conditions of 130° F. or greater, the laminates display a marked propensity to reverse any tendency for downward curl and to instead curl upward at their edges, again increasing the possibility of leakage at overlap joints. Thus, it has been desired to provide improved waterproofing laminates which have the aforedescribed composite support system and incorporate the advantages thereof but which do not exhibit cracking or peeling of the polymer film or upward edge curling upon exposure to high temperatures.

SUMMARY OF THE INVENTION

The present invention provides improved waterproofing laminates comprising a polymer film in a composite laminate support system, wherein the polymer film exhibits a substantially decreased tendency to undergo cracking under conditions of high temperature commonly encountered in a rooftop environment. The laminates of the present invention display a high level of dimensional stability under the conditions of thermal cycling which can be encountered in roofing applications and do not undergo the upward edge curling referred to above.

The membranes of this invention comprise (a) a layer of a shrinkable polymer film having a shrinkage onset temperature above 100° F.; (b) a film or foil layer having a lower coefficient of thermal expansion than the polymer film below the shrinkage onset temperature and exhibiting a lesser degree of shrinkage than the polymer film above the shrinkage onset temperature; and (c) a thermoplastic adhesive layer positioned between and adhering the film and the foil, the adhesive having sufficient bonding strength or ridigity below the shrinkage onset temperature to substantially inhibit relative movement between the polymer film and the foil and having sufficient plasticity above the shrinkage onset temperature to permit relative movement of the film and the foil. In a preferred embodiment, the membrane is rendered self adhesive by including therein a layer of an adhesive material, preferably a bituminous, waterproofing, pressure sensitive adhesive, adhered to that surface of the foil layer opposite the thermoplastic adhesive layer.

The present invention also relates to waterproofed roofing assemblies comprising the membranes of this invention.

For a fuller description of the present invention reference should be made to the following detailed description taken in coconnection with the accompanying drawings.

DETAILED DESCRIPTION OF THE INVENTION

Figure 1:
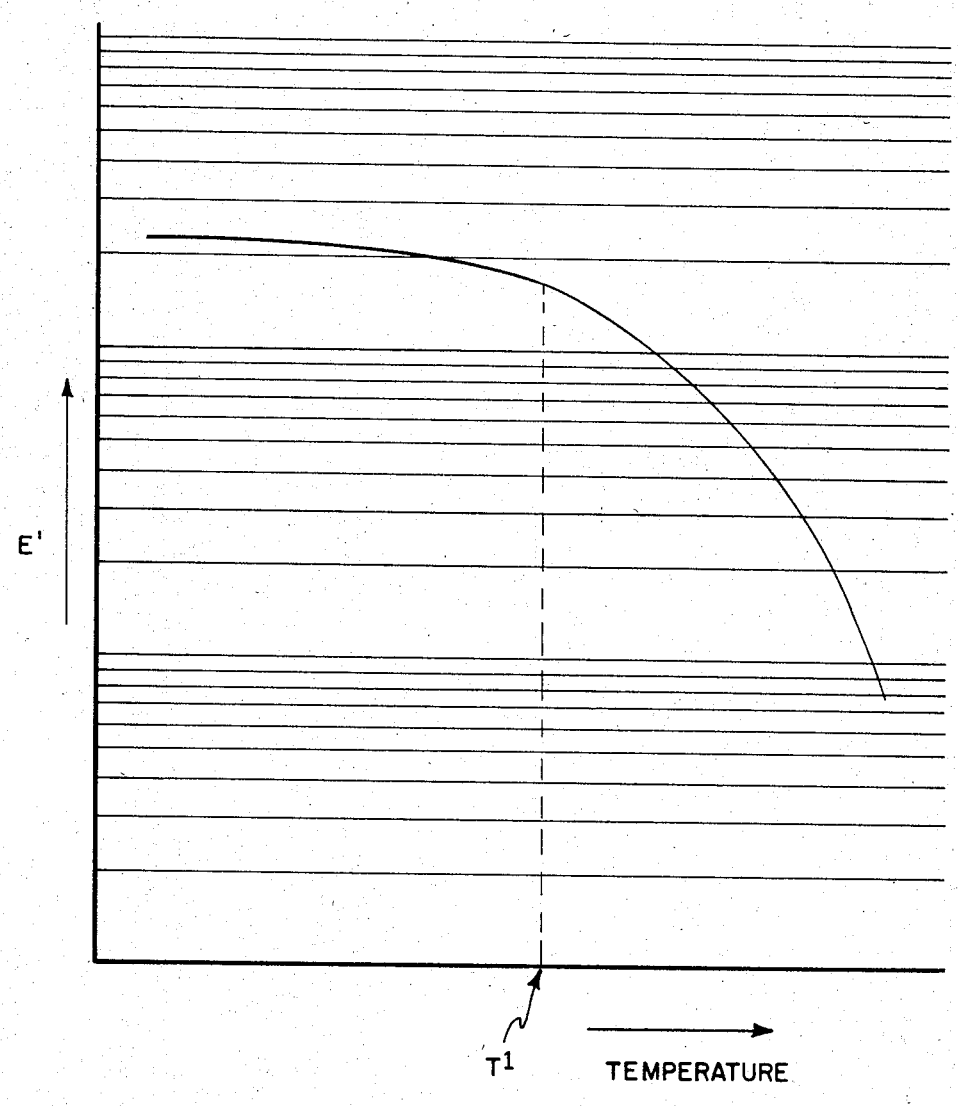
FIG. 1 is a graphical illustration of a characteristic curve of a thermoplastic adhesive of the present invention showing the dependence of the elasticity of the adhesive on temperature.

The polymeric films generally employed as support materials in roofing laminates normally possess a relatively high coefficient of thermal expansion, e.g. above $30 \times 10^{-6}$ in./in./°F., such that with increasing temperatures in a rooftop environment these films can undergo excessive expansion. This expansion will generally result in wrinkling or buckling of the film which can destroy the water-tightness of the applied laminate system, particularly in overlap joint areas between adjacent laminates. Thus, it has proven beneficial to treat or prepare the polymer film in a manner which results in the film having a shrinkage capability above a certain temperature ("shrinkage onset temperature") in order to effectively counteract the otherwise inherent expansion of the film. Imparting this shrinkage behavior to the film is most preferably accomplished by mechanically stretching the film in both its lengthwise and widthwise direction to provide a biaxial orientation thereto or by cross-laminating uniaxially or biaxially oriented (stretched) films. Processes for preparing oriented (biaxially oriented or cross-laminated) polymer films are well known in the art.

Notwithstanding the shrinkage behavior of the oriented polymer films, below the shrinkage onset temperature these films expand as per their relatively high coefficient of thermal expansion and thus, may provide the aforementioned disadvantages of such expansion. This excessive expansion may be controlled by laminating or coextensively bonding the oriented polymer film to a metal foil having a lower coefficient of thermal expansion than the polymer film, e.g., as disclosed in U.S. Pat. No. 4,396,665. To this end, the polymer film and metal foil have heretofore been rigidly bonded by adhesives which largely retain their high level of rigidity over the range of temperatures experienced in the roof environment. Thus, these adhesives, when set, are relatively hard, inflexible materials which retain the respectively bonded film and foil in fixed relation under varying thermal conditions, in keeping with the objective of utilizing the metal foil to control thermal expansion of the polymer film.

In accordance with the present invention, it has been determined that the employment of such adhesives is highly undesirable with regard to maintaining the integrity and dimensional stability of the oriented, shrinkable polymer film and the laminate over extended time in rooftop applications. Specifically, it has been determined that such adhesives or, more specifically, the fixed lamination of the film to the foil by such adhesives, deleteriously inhibit the shrinkage of the polymer film above the shrinkage onset temperature to the effect that the polymer film, in attempting to relieve internal stresses which would normally be relieved by unhindered shrinkage, undergoes substantial cracking and splitting at its interior areas and curling along its edges.

Further in accordance with the present invention, it has now been found that these problems can be effectively overcome by bonding the polymer film to the foil using certain thermoplastic adhesives. The present invention accordingly provides laminate membrane assemblies comprising a shrinkable polymer film having a shrinkage onset temperature above 100° F.; a foil layer having a lower coefficient of thermal expansion than the polymer film below the shrinkage onset temperature of the polymer film and exhibiting a lesser degree of shrinkage than the polymer film above the shrinkage onset temperature; and a thermoplastic adhesive layer positioned between and adhering the film to the foil, the adhesive having sufficient bonding strength and rigidity below the shrinkage onset temperature to substantially inhibit relative movement between the polymer film and the foil and having sufficient plasticity at and above the shrinkage onset temperature to permit relative movement of the film and the foil.

The maintenance of a relatively rigid bond between the film and the foil below the shrinkage onset temperature provides that the expansion of the laminate below that temperature is controlled primarily as a function of the coefficient of thermal expansion of the foil, i.e., the thermal expansion of the film is controlled by its adherence to the foil and the coefficient of thermal expansion of the laminate assembly is close to that of the foil per se. However, although the thermal expansion and movement of the film is substantially inhibited below the shrinkage onset temperature, it need not be, and preferably is not, totally inhibited. The film may expand and move relative to the foil to a minor degree in order to relieve stresses generated by the inherent tendency of the film to expand. If not relieved, such stresses may result in wrinkling or buckling of the film. This minor relative movement may prove specially desirable at temperatures approaching the shrinkage onset temperature, at or before which the cumulative film expansion is at its greatest level. Accordingly, the thermoplastic adhesive preferably exhibits a minor level of plasticity even at temperatures below the shrinkage onset temperature. The dimensional stability of the inventive laminates below the shrinkage onset temperature is thus significantly enhanced by coupling the substantial inhibition of the thermal expansion of the polymer film with the preferred condition of allowance of a minor degree of expansion and movement of the film, particularly at temperatures approaching the shrinkage onset temperature.

At and above shrinkage onset temperature, the thermoplastic adhesive of the present invention softens to permit relative movement between the film and foil. As used herein, the term "thermoplastic" is to be taken in its usual and ordinary sense, i.e., to refer to the condition or property of softening or fusing when heated and of hardening again when cooled. The thermoplastic adhesives used in the present invention become sufficiently plastic at or slightly below the shrinkage onset temperature, e.g., about 1° F. to 10° F. below the shrinkage onset temperature to permit relative movement between the film and the foil, i.e., to permit shrinkage onset of the film and to satisfactorily accomodate the shrinkage of the film at that point. Thereafter, as as a function of increasing temperature, the adhesives become increasingly plastic, as necessary to satisfactorily accomodate additional shrinkage of the film. Satisfactory accomodation of the shrinkage of the polymer film is that which allows the film to shrink at least to a degree sufficient to relieve internal stresses therewithin and, thereby, substantially decrease or eliminate the cracking and splitting of the film and edge curling of the laminate which would otherwise occur. Thus, the relative movement of the film and foil is sufficiently uninhibited to permit the film to shrink to the degree necessary to achieve relief of internal stress. Notwithstanding the thermal dependence of the plasticity of the adhesive, however, it should provide sufficient adhesion at all temperatures to which the laminate is exposed to retain the film and foil in adherent, laminated relationship.

As noted above, at temperatures slightly below the shrinkage onset temperature the thermoplastic adhesive may acquire sufficient plasticity to permit relative movement of the polymer film. In such instances, the polymer film, which still tends to expand at such temperatures, may undergo such expansion without substantial inhibition by the adhesive. Although this may be beneficial in permitting the aforementioned desired level of minor expansion and movement of the film below the shrinkage onset temperature, it is nonetheless preferred that the adhesive acquire the necessary plasticity to permit relative movement of the film at a temperature closely approaching or at the shrinkage onset temperature. Where the adhesive acquires the necessary plasticity within about 10° F. of the shrinkage onset temperature, the level of uninhibited expansion of the polymer film is relatively minimal and does not generally adversely affect the dimensional stability of the laminate.

Any flexible polymer film or sheet which can be treated or coated to provide a shrinkage capability to the film or sheet when heated can be used in the present invention. Biaxially oriented or oriented and cross-laminated films of such polymers an polyolefins, vinylidene chloride, polystyrene, polyvinyl chloride, polyethylene terephthalate, polyethylene vinyl acetate copolymer, butadiene-acrylonitrile copolymer, and ethylene-propylene-diene monomer terpolymer may be employed. Preferred films are biaxially oriented and oriented and cross-laminated polyolefins, especially polyethylene. Oriented and cross-laminated high density polyethylene is an especially preferred film material.

The shrinkage onset temperature of the polymer film may fall within the range of 100° F. to 200° F. The preferred biaxially oriented and oriented and cross-laminated polyethylenes generally have a shrinkage onset temperature within the range of about 120° F. to 150° F. It is preferred to employ polymer films which shrink about 1% to 3%, i.e., which shrink in a widthwise and lengthwise direction an amount equal to about 1% to 3% of the initial surface area of the polymer film. This level of shrinkage has been found to satisfactorily counteract or compensate for the thermal expansion of most polymer films while ultimately exhibiting, after shrinkage, satisfactory physical and dimensional stability and a satisfactory coverage or surface area of polymer film on the laminate.

The polymer film preferably has a thickness in the range of about 3 mils to 10 mils. Generally, the laminates of the invention are constructed with the polymer film initially being coextensive with the foil layer and bonded to the foil by the thermoplastic adhesive across its entire area.

The polymer films may contain or be coated with materials designed to prevent degradation, e.g., ultraviolet absorbers.

The adhesive used to bond the polymer film to the foil layer may be any hot melt, organic solvent-based, or water-based adhesive exhibiting the desired thermoplastic behavior. Consistent with the aforementioned shrinkage onset temperatures of polymer films used herein, the adhesives most suited for use herein are those which become sufficiently plastic to permit relative movement between the film and foil at temperatures within the range of about 90° F. to 200° F. For a given polymer film, an adhesive may exhibit relatively minor levels of plasticity or "give" below the shrinkage onset temperature and gradually increase in plasticity with increasing temperature. As the shrinkage onset temperature is approached or reached, the increase in plasticity should accelerate to a level permitting relative movement of the film and foil.

Thermoplastic ahesives and methods of formulating and preparing some are well known in the art. Thermoplastic adhesives known in the art which can be used herein include those based on ethylene copolymers, propylene copolymers, polyvinylesters, polyamides, EPDM, polyvinylacetates, acrylic resins, and mixtures thereof. Preferred adhesives are those based on ethylene copolymers, particularly ethylene-vinyl acetate (EVA) copolymers.

The desired adhesiveness and thermoplastic and viscometric properties may be achieved in the adhesive by various methods known in the art. Appropriate mixtures of polymers may be used, as well as modulation of comonomer content and molecular weight in a given base polymer. In addition, known additives such as plasticizers, modifier resins, waxes, processing oils, fillers and thickening agents, may be used to modulate the thermoplastic and viscometric properties of the adhesive. Anti-oxidants and preservatives may also be included. The utilization of modifiers and additives to adjust the properties of thermoplastic adhesives is well known and, in general, procedures known in the art may be employed for achieving desired properties.

As one quantitative measure which may be used in determining the suitability of a given adhesive for use in the present invention, one may measure the elastic component of Young's modulus, $E'$, as a function of temperature, utilizing procedures known in the art. Such measurements may be graphically presented as in FIG. 1 wherein the vertical axis represents measurement of $E'$ in dynes/cm$^2$ on a logarithmic scale, the hortizontal axis shows increasing temperature, and $T^1$ is the shrinkage onset temperature of the polymer film. In adhesives suitable for use herein, $E'$ should be relatively constant at temperatures below $T_1$, as depicted by the rubbery "plateau" region of the curve of FIG. 1 (although $E'$ may decrease slightly below $T^1$, evidencing the preferred minor degree of increasing plasticity below $T^1$) and, at temperatures at or slightly below $T^1$, $E'$ should decrease rapidly and thereafter continue to decrease, as depicted by the "break" in the curve of FIG. 1 at $T^1$ and the continued downward slope thereafter.

The change in $E'$ as a function of temperature will generally serve as an indication of changes in the plasticity of the adhesive, with decreasing $E'$ evidencing increasing plasticity. Suitable values for $E'$ can vary over a wide range depending on the type of polymeric film or foil which is used.

Particularly preferred adhesives for use in this invention comprise EVA in a weight percentage range of about 60% to 80% modified with a rosin ester and a picco resin to increase adhesiveness and achieve substantial softening (plasticity) in the range of 120° F. to 140° F. The ring and ball softening point (ASTM E-28-67) of the particularly preferred adhesives is in the range of 200° F. to 250° F., most preferably 220° F. to 250° F.

A relatively thin layer of the thermoplastic adhesive can be used in the inventive laminates. Generally, an adhesive layer of 0.7 to 1.3 mils in thickness provides satisfactory adhesion and thermal performance.

As used herein, the term "foil" includes the metal films and foils of aluminum, copper, zinc, etc.,; polymeric sheets and films such as polyester sheets; and the various woven and nonwoven scrim materials such as nonwoven and woven polyester scrims, nonwoven and woven glass scrims, and woven polyamide scrims. The thickness of the foil layer is normally in the range of about 0.1 to 10 mils.

As indicated previously, the coefficient of thermal expansion of the foil is lower than that of the polymer film. In addition it is preferred that the coefficient of thermal expansion is less than about $25 \times 10^{-6}$ in./in./°F. Aluminum foil, with an approximate coefficient of thermal expansion of $12 \times 10^{-6}$ in./in./°F. is the preferred foil material of the invention.

Above the shrinkage onset temperature, the foil should have a lower degree of shrinkage than the polymer film. Depending on the type of foil layer used, it may simply shrink less than the polymer film, retain an essentially constant dimension or, in most instances, continue to undergo a minor level of expansion, consistent with its relatively low coefficient of thermal expansion.

In a preferred embodiment, the laminates of this invention also comprise an adhesive layer adhered to and coextensive with the surface of the foil layer opposite the thermoplastic adhesive layer. Self adhesive or pressure-sensitive bituminous waterproofing adhesives are preferred, particularly comprising a mixture of a bituminous material and a natural or synthetic polymer, preferably a rubber or other elastomeric polymer. The amount of polymer employed in such compositions is typically from about 1 to 100, preferably about 20 to 50, percent by weight of the bituminous material. The term "bituminous adhesive" as used herein includes adhesive compositions containing asphalt, tar such as coal tar, or pitch. The bituminous adhesive layer may be reinforced with fibers and/or particulate fillers. The adhesive composition may also contain a conventional extender component such as mineral oil. Suitable polymers include thermoplastic polymers such as polyethylene and the like. As aforementioned, the preferred polymer component is rubber which may be a virgin rubber or reclaimed rubber which is blended into the bitumen at elevated temperature to form a smooth mix. Generally, suitable bituminous adhesive compositions have softening points (measured by the Ring and Ball method) of 70° to 120° C., preferably 75° to 100° C., and penetration values of 50 to 400, preferably 50 to 100 dmm. at 25 C. (150 g/5-ASTM D217).

In order to give optimum sealing and waterproofing performance the adhesive layer should be at least 0.010 inch thick and preferably in the range of about 0.025 to about 0.200 inch thick. The adhesive layer can be comprised of one or more layers of the aforementioned bituminous adhesive, not necessarily of the same composition, to give an adhesive layer within the overall aforementioned thickness range. Further, the adhesive layer can have a reinforcement such as an open weave fabric, gauze, scrim or the like located therein to strengthen it. The bituminous adhesive layer, at least at its surface remote from the foil layer, is preferably pressure-sensitive and tacky at normal ambient temperature in order that it be self-adhesive to a substrate. The bituminous adhesive layer serves to form a continuous waterproofing layer which is self-sealing against punctures at high and low temperature. Normally, the adhesiveness of the bituminous adhesive composition is sufficient to provide a satisfactory bond with the foil layer.

Figure 2:
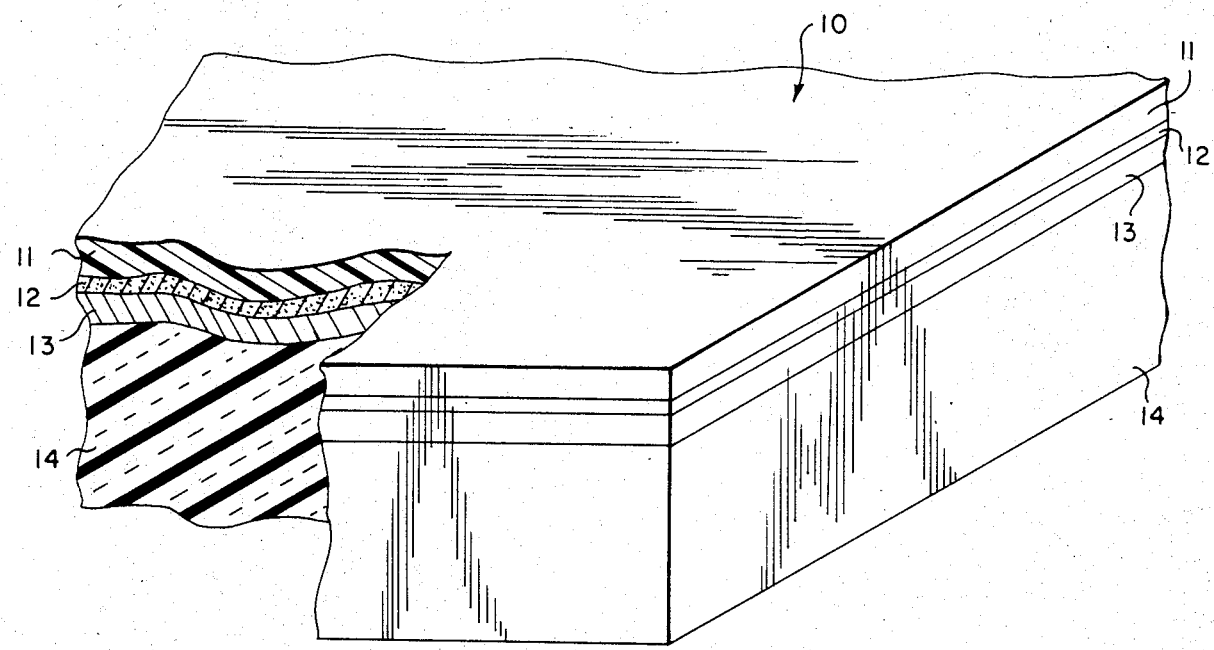
FIG. 2 is a partial perspective view of a membrane assembly constructed in accordance with one embodiment of the present invention.

Referring further to the drawings, FIG. 2 is a partial perspective view of a preferred laminate of the present invention. The laminate 10 comprises an uppermost, shrinkable polymer film 11 bonded over its entire surface to a foil layer 13 by thermoplastic adhesive layer 12. A relatively thick layer of a bituminous adhesive composition 14 is bonded to foil 13 to provide an adhesive capability to the laminate for facile application to a substrate. To facilitate handling of the laminate prior to application, a release layer (not shown), e.g., siliconized paper, can be mated to the exposed, adhesive surface of layer 14. The release layer is readily removed to expose the adhesive surface of layer 14 just prior to application. The use of release layers in this fashion is described, for example, in U.S. Pat. No. 3,900,102.

Figure 3:
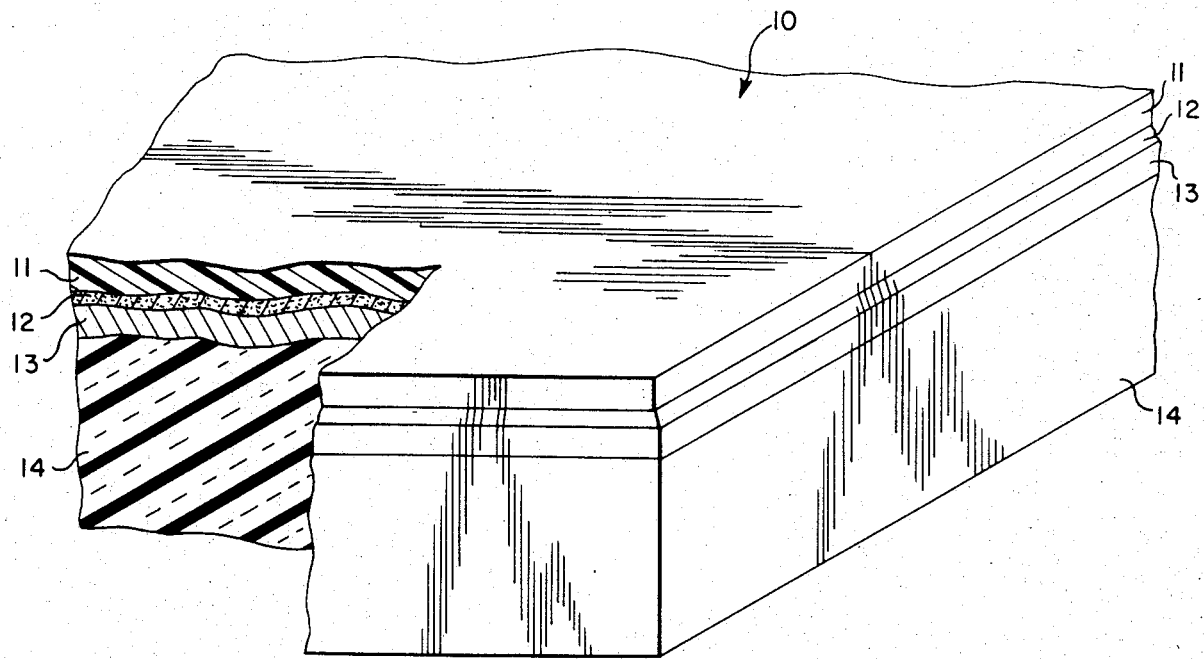
FIG. 3 is a similar view of the membrane assembly of FIG. 2 showing shrinkage of the polymer film under conditions of high temperature.

FIG. 3 illustrates the laminate 10 after exposure to temperatures above the shrinkage onset temperature of polymer film 11. Thus, polymer film 11 has smaller widthwise and lengthwise dimensions than in FIG. 2 and adhesive layer 12 has become sufficiently plastic to permit shrinkage to the smaller dimension.

The laminate 10 retains an essentially flat profile through repeated temperature cycling due to its ability to suppress and accomodate expansion of the polymer film and to permit necessary shrinkage of the polymer film.

In waterproofing applications of the inventive laminates, a plurality of the laminates may be applied to a substrate in side-by-side, abutting fashion or in an overlapping arrangement and sealed at the abutting or overlapping joint, e.g. with a suitable liquid adhesive or adhesive tape. The laminates may be affixed to the substrate by, for example, spot application of adhesive at the job site or by nailing. A ballasting layer such as gravel may also be used to anchor the laminate on the substrate.

The preferred laminates of this invention comprising a bituminous adhesive layer adhered to the outer foil surface, e.g., bituminous adhesive layer 14, are preferably applied to the substrate in overlapping fashion with the adhesive layer down and a marginal portion of the adhesive layer bonded to the facing layer of the underlying (overlapped) laminate to provide a watertight seal. The remainder of the adhesive layer serves to adhere the laminate to the substrate. While this is the preferred method of application, the laminate may also be applied with the adhesive layer uppermost, e.g., as described in U.S. Pat. No. 4,386,981 of Allan S. Clapperton.

As an additional component, the laminates may comprise a coating or laminated layer on the surface of the polymer film remote from the thermoplastic adhesive layer. In particular, white coatings or layers which reflect incident radiation may be used to decrease temperature build up in the laminate and otherwise afford protection thereto. These coatings or layers may be applied at the job site or factory applied.

The laminates of this invention may be fabricated by coating the thermoplastic adhesive in a fluid state, e.g., as a melt or solution, on the polymer film and laminating the foil layer to the coated polymer film while the adhesive is still sufficiently fluid to satisfactorily adhere to the foil. A bituminous adhesive layer may thereafter be applied to the foil by methods well known in the art, followed by application of release paper to the exposed surface of the bituminous adhesive. The laminates are generally stored and shipped in rolls and unrolled and applied at a job site with removal of the release paper, e.g. as illustrated in U.S. Pat. No. 3,900,102.

The present invention is further illustrated by the following Example which is intended as illustrative and not limitative.

EXAMPLE

An 8 mil polyethylene sheet consisting of four cross-laminated uniaxially oriented polyethylene plies was coated with an EVA based hot melt thermoplastic adhesive comprising about 70% polyethylene-co-vinyl acetate with a vinyl acetate content of 25%, about 20% of a rosin ester, about 8% of a picco resin, and about 3% wax. The sheet was coated by first melting the adhesive composition and applying the fused composition to the sheet with a roller applicator. Immediately after application of the adhesive, i.e. prior to substantial cooling of the adhesive, the coated sheet was transported into contact with a 0.35 mil aluminum foil sheet having the same width as the polyethylene sheet, and the resultant laminate subjected to sufficient pressure between opposed rolls to provide an adhesive layer thickness of about 1 mil. One of the opposed pressurizing rolls was chilled to provide a rapid set of the adhesive after compression.

The adhesive utilized in this Example had a ring and ball softening point of about 220° F. (ASTM-E 28-67), a density of about 0.975 gm/cc (ASTM-1475), a tensile strength of about 62.9 lb/in$^2$ (ASTM D-638-68) and elongation of about 995% (ASTM-D-638-68).

The polymer film was measured to have coefficient of thermal expansion of about $68 \times 10^{-6}$ in./in./°F., while that of the aluminum foil was measured as about $14 \times 10^{-6}$ in./in./°F. The shrinkage onset temperature of the polymer film was about 135° F.

A waterproofing bituminous adhesive consisting of asphalt, styrene-butadiene rubber, and oil was then applied to the exposed surface of the aluminum foil to complete the assembly. The bituminous adhesive layer was about 42 mils in thickness.

For purposes of comparison, a "control" laminate similar to the above was prepared utilizing in place of the thermoplastic adhesive an ethylene-acrylic acid copolymer based laminating adhesive sold by the Dow Chemical Co. as "Dow 435". This adhesive had a melting point above 500° F. and did not exhibit significant plasticity below 250° F.

The respective laminates were adhered to a substrate and subjected to repeated thermal cycling over a temperature range of −25° F. to 220° F. The inventive laminate maintained a flat profile on the substrate without buckling or edge curling. The polymer film of the inventive laminate retained a smooth, flat appearance and, by visual examination, did not crack or peel. Over the same period of time (about 6 days; 12 thermal cycles) the control laminate curled and buckled and the polyethylene film underwent substantial cracking.

In a separate test, the respective adhered laminates were subjected to respective temperatures of 180° F., 160° F. and 120° F. for extended periods of time. After 21 days at 180° F., the polyethylene film of the control laminate was cracked and wrinkled. Similar results were observed after 50 days at 160° F. After one week at 120° F., the control laminate was curled and buckled. In contrast, after similar periods of time at the respective temperatures, the inventive laminate retained its smooth, flat profile on the substrate and no cracking of the polyethylene film as observed.

What is claimed is:

1. A laminate membrane assembly comprising:
   (a) a layer of a shrinkable polymer film having a shrinkage onset temperature above 100° F.;
   (b) a layer of a foil having a lower coefficient of thermal expansion than said polymer film below said shrinkage onset temperature; and
   (c) a layer of a thermoplastic adhesive postioned between and adhering said film and said foil, said adhesive having sufficient bonding strength below said onset temperature to substantially inhibit relative movement between said film and said foil such that, with increasing temperature below said shrinkage onset temperature, the thermal expansion of said film is controlled by its adherence to said foil and having sufficient plasticity above said shrinkage onset temperature to permit relative movement between said film and said foil such that said film undergoes shrinkage at and above said shrinkage onset temperature without substantial inhibition by its adhesion to said foil while retained in adherent, laminated relationship with said foil; and
   (d) an adhesive layer on that side of said foil opposite said layer of a thermoplastic adhesive.

2. A membrane of claim 1 wherein said adhesive layer comprises a bituminous adhesive composition.

3. A membrane of claim 1 wherein said polymer film is biaxially oriented or oriented and cross-laminated.

4. A membrane of claim 3 wherein said polymer film is a polyethylene film.

5. A membrane of claim 1 wherein said thermoplastic adhesive is an ethylene-vinyl acetate copolymer based adhesive.

6. A membrane of claim 1 wherein said thermoplastic adhesive acquires said plasticity at a temperature within the range of about 90° F. to 200° F.

7. A membrane of claim 1 wherein said foil is selected from the group consisting of metal foils, polymer sheets, woven scrims, and unwoven scrims.

8. A membrane of claim 7 wherein said foil is aluminum foil.

9. A laminate membrane assembly comprising:
   (a) a layer of a shrinkable polymer film having a shrinkage onset temperature in the range of about 120° F. to 150° F.;
   (b) a layer of a foil having a lower coefficient of thermal expansion than said polymer film below said shrinkage onset temperature; and
   (c) a layer of a thermoplastic adhesive positioned between and coextensive with said film and said foil and adhering said film to said foil;
   said thermoplastic adhesive having sufficient bonding strength and rigidity below said shrinkage onset temperature to substantially inhibit relative movement between said film and said foil such that, with increasing temperature below said shrinkage onset temperature, the thermal expansion of said film is controlled by its adherence to said foil; and said thermoplastic adhesive having sufficient plasticity at and above said shrinkage onset temperature to permit relative movement between said film and said foil such that said film undergoes shrinkage at and above said shrinkage onset temperature without substantial inhibition by its adhesion to said foil while retained in adherent laminated relationship with said foil; and (d) an adhesive layer on that side of said foil opposite said layer of a thermoplastic adhesive.

10. A membrane of claim 9 wherein said adhesive layer comprises a bituminous adhesive composition.

11. A membrane of claim 9 wherein said polymer film is a biaxially oriented or oriented and cross-laminated high density polyethylene film.

12. A membrane of claim 11 wherein said foil is aluminum foil.

13. A membrane of claim 9 wherein said thermoplastic adhesive is an ethylene-vinyl acetate copolymer based adhesive.

14. A membrane of claim 13 wherein said thermoplastic adhesive contains one or more modifying resins.

15. A membrane of claim 9 wherein said foil has a coefficient of thermal expansion of less than $25 \times 10^{-6}$ in./in./°F.

16. A membrane of claim 9 wherein said polymer film is capable of undergoing about 1% to about 3% shrinkage.

17. A waterproofing roofing assembly comprising a roofdeck substrate having disposed thereover a plurality of membranes comprising:

(a) a layer of shrinkable polymer film having a shrinkage onset temperature above 100° F.;

(b) a layer of a foil having a lower coefficient of thermal expansion than said polymer film below said shrinkage onset temperature; and (c) a layer of a thermoplastic adhesive positioned between and adhering said film and said foil, said adhesive having sufficient bonding strength below said onset temperature to substantially inhibit relative movement between said film and said foil and having sufficient plasticity above said shrinkage onset temperature to permit relative movement between said film and said foil.

18. An assembly of claim 17 wherein said membranes are disposed in overlapping fashion.

19. An assembly of claim 18 wherein said membranes further comprise a bituminous adhesive layer adhered to that surface of said foil remote from said layer of a thermoplastic adhesive, a marginal portion of respective bituminous adhesive layers being bonded to the facing layers of respective adjacent membranes to form waterproof overlap joints.

20. An assembly of claim 19 wherein said membranes are disposed with the respective bituminous adhesive layers facing said substrate and adhering said membranes to said substrate.

21. A membrane of claim 1 wherein said polymer film is capable of undergoing about 1% to about 3% shrinkage.

22. A membrane of claim 1 wherein said foil does not shrink at temperatures above said shrinkage onset temperature.

23. A membrane of claim 21 wherein said foil does not shrink at temperatures above said shrinkage onset temperature.

24. A membrane of claim 1 wherein said polymer film has a thickness of about 3 mils to about 10 mils.

25. A membrane of claim 1 wherein said foil has a thickness of about 0.1 mil to about 10 mils.

26. A membrane of claim 1 wherein said adhesive layer has a thickness of about 0.7 to about 1.3 mils.

27. A membrane of claim 1 further comprising an incident radiation reflective layer coated on or laminated to the surface of said polymer film remote from said thermoplastic adhesive layer.

28. A self adhesive waterproofing laminate comprising:

a layer of a shrinkable polymer film which is capable of undergoing about 1% to about 3% shrinkage and has a shrinkage onset temperature above 100° F.;

a layer of a metal foil which has a lower coefficient of thermal expansion than said polymer film below said shrinkage onset temperature;

a layer of a thermoplastic adhesive positioned between said film and said foil and adhering said film and said foil;

said thermoplastic adhesive having sufficient bonding strength and rigidity below said shrinkage onset temperature to substantially inhibit relative movement between said film and said foil such that, with increasing temperature below said shrinkage onset temperature, the thermal expansion of said film is controlled by its adherence to said foil; and said thermoplastic adhesive having sufficient plasticity at and above said shrinkage onset temperature to permit relative movement between said film and said foil such that said film undergoes shrinkage at and above said shrinkage onset temperature without substantial inhibition by its adhesion to said foil while retained in adherent laminated relationship with said foil; and a pressure sensitive waterproofing bituminous adhesive layer on that side of said foil opposite said layer of a thermoplastic adhesive.

29. A membrane of claim 1 wherein said foil exhibits a lesser degree of shrinkage than said polymer film above said shrinkage onset temperature.

30. A membrane of claim 9 wherein said foil exhibits a lesser degree of shrinkage than said polymer film above said shrinkage onset temperature.

31. A membrane of claim 17 wherein said foil exhibits a lesser degree of shrinkage than said polymer film above said shrinkage onset temperature.

* * * * *